(12) United States Patent
Schueppert et al.

(10) Patent No.: US 9,152,692 B2
(45) Date of Patent: Oct. 6, 2015

(54) GENERATING N-GRAM CLUSTERS ASSOCIATED WITH EVENTS

(75) Inventors: Michael Jens Schueppert, New York, NY (US); Kumar Mayur Thakur, West Orange, NJ (US)

(73) Assignee: Google Inc., Mountain View, CA (US)

( * ) Notice: Subject to any disclaimer, the term of this patent is extended or adjusted under 35 U.S.C. 154(b) by 385 days.

(21) Appl. No.: 13/536,314

(22) Filed: Jun. 28, 2012

(65) Prior Publication Data

US 2015/0169722 A1 Jun. 18, 2015

(51) Int. Cl.
*G06F 17/30* (2006.01)

(52) U.S. Cl.
CPC .... *G06F 17/30598* (2013.01); *G06F 17/30551* (2013.01)

(58) Field of Classification Search
CPC .................................................. G06F 17/3071
See application file for complete search history.

(56) References Cited

U.S. PATENT DOCUMENTS

| | | | |
|---|---|---|---|
| 8,589,404 B1* | 11/2013 | Dunkelberger et al. | 707/743 |
| 2002/0174095 A1* | 11/2002 | Lulich et al. | 707/1 |
| 2009/0055348 A1* | 2/2009 | Wilding et al. | 707/1 |
| 2012/0131139 A1* | 5/2012 | Siripurapu et al. | 709/217 |
| 2013/0110839 A1* | 5/2013 | Kirshenbaum | 707/740 |

* cited by examiner

*Primary Examiner* — Anh Tai Tran
(74) *Attorney, Agent, or Firm* — Fish & Richardson P.C.

(57) ABSTRACT

Methods, systems, and apparatus, including computer programs for receiving a set of content items, each content item including a time reference and digital content that is distributed using one or more computer-implemented services, for each content item: determining an event time based on a respective time reference, identifying one or more n-grams based on text of the content item, associating each of the one or more n-grams with the event time, and including the one or more n-grams in a superset of n-grams, the superset of n-grams including n-grams provided from one or more of the content items in the set of content items, generating one or more n-gram clusters based on the superset of n-grams, each n-gram cluster providing a description of an event and including at least one n-gram and an associated event time and storing each of the one or more n-gram clusters in a cluster database.

24 Claims, 4 Drawing Sheets

Johnny Superstar, Tigers guard, to announce retirement at press conference

By Newsman

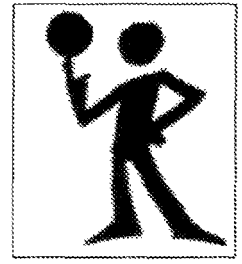

Johnny Superstar will retire from GAME.

The press conference is scheduled for tomorrow at 2PM EST.

Superstar, a veteran of 15 pro GAME seasons, believes that he has nothing left to prove. He may be right. Superstar is a 10 time league MVP, and has won 8 world championships.

*Newsman is a Staff Writer for GenericNewsSite.*

Posted 10:32AM, May 25, 2013

*FIG. 2*

GENERATING N-GRAM CLUSTERS ASSOCIATED WITH EVENTS

BACKGROUND

Users often utilize various web-based services (e.g., search engines, social networks, short messaging services, and the like) to retrieve information. In some cases, information can be related to real-world and/or virtual events. In some instances, recognizing the occurrence of an event can influence the results that users expect to receive from such web-based services.

SUMMARY

This specification relates to generating n-gram clusters associated with events.

Innovative aspects of the subject matter described in this specification may be embodied in methods that include the actions of receiving a set of content items, each content item in the set of content items including a time reference and digital content that is distributed using one or more computer-implemented services, for each content item in the set of content items: determining an event time based on a respective time reference of the content item, identifying one or more n-grams based on text of the content item, associating each of the one or more n-grams with the event time, and including the one or more n-grams in a superset of n-grams, the superset of n-grams including n-grams provided from one or more of the content items in the set of content items. Actions further include generating one or more n-gram clusters based on the superset of n-grams, each n-gram cluster providing a description of an event and including at least one n-gram and an associated event time and storing each of the one or more n-gram clusters in a cluster database. Other embodiments of these aspects include corresponding systems, apparatus, and computer programs, configured to perform the actions of the methods, encoded on computer storage devices.

These and other embodiments may each optionally include one or more of the following features. For instance, actions further include, for each content item in the set of content items, removing one or more characters to provide the text as clean text; the one or more characters include at least one of one or more stop words and punctuation; generating one or more n-gram clusters includes: determining one or more frequencies, each frequency being associated with an n-gram of the superset of n-grams, and providing a set of n-grams based on the one or more frequencies, the set of n-grams including a subset of the superset of n-grams, the one or more n-gram clusters being generated based on n-grams provided in the set of n-grams; a frequency for a particular n-gram is determined based on a number of times the particular n-gram is provided in the superset of n-grams; providing a set of n-grams based on the one or more frequencies includes, for each n-gram in the superset of n-grams: determining whether a respective frequency meets or exceeds a threshold frequency, and including the n-gram in the set of n-grams if the respective frequency meets or exceeds the threshold frequency; providing a set of n-grams based on the one or more frequencies includes, for each n-gram in the superset of n-grams: determining whether a respective frequency meets or exceeds a threshold frequency, and excluding the n-gram from the set of n-grams if the respective frequency is less than the threshold frequency; each n-gram cluster includes at least two n-grams that appear together in one or more content items of the set of content items; the set of content items is provided as a subset of a plurality of content items; receiving a set of content items includes: receiving the plurality of content items, for each content item in the plurality of content items, determining whether the content item includes a time reference, and including the content item in the set of content items if the content item includes a time reference; receiving a set of content items includes: receiving the plurality of content items, for each content item in the plurality of content items, determining whether the content item includes a time reference, and excluding the content item from the set of content items if the content item does not include a time reference; receiving a set of content items includes: receiving the plurality of content items, for each content item in the plurality of content items, determining whether a number of characters provided in the content item exceeds a threshold number of characters, and including the content item in the set of content items if the number of characters does not exceed the threshold number of characters; receiving a set of content items includes: receiving the plurality of content items, for each content item in the plurality of content items, determining whether a number of characters provided in the content item exceeds a threshold number of characters, and excluding the content item from the set of content items if the number of characters exceeds the threshold number of characters; the content items of the set of content items are received from a content item repository stored in computer-memory; the content items of the set of content items include digital content that is published using one or more computer-implemented services; the one or more computer-implemented services include at least one of a news service, a social networking service and a blogging service; at least one respective time reference includes an explicit time reference; and at least one respective time reference includes an implicit time reference.

Particular embodiments of the subject matter described in this specification may be implemented so as to realize one or more of the following advantages. In some examples, computer-implemented services can be improved by identifying terms that are likely to be of interest to users in the future. For instance, terms that are related to some future event can be identified. In some examples, computer-implemented services can be further improved by preemptively determining relationships between terms that have been identified as being of interest to users. For instance, it can be determined that two or more terms are related to a common future event.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 2 depicts an example content item.

DETAILED DESCRIPTION

Figure 1:
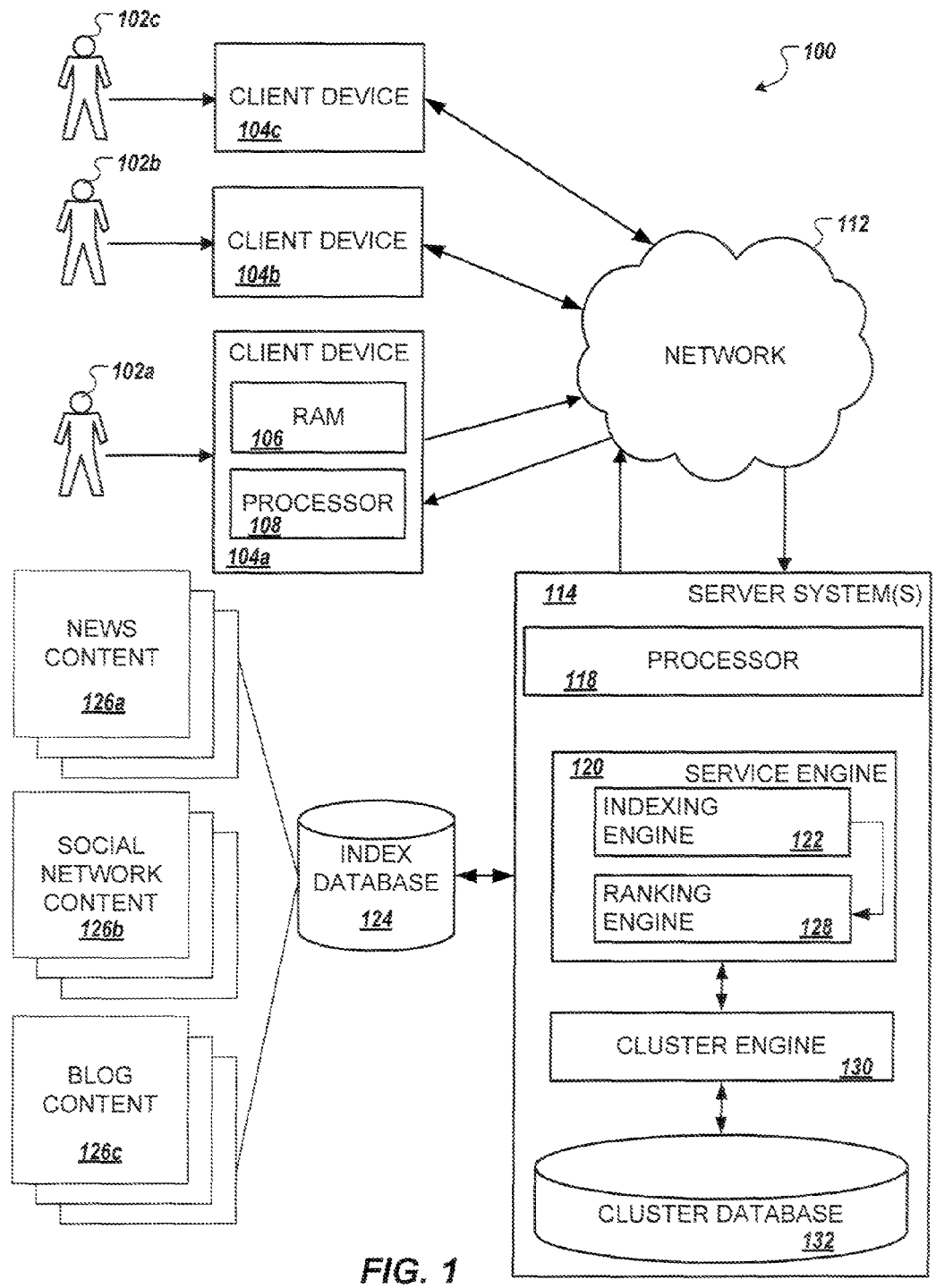
FIG. 1 is a block diagram of an example system architecture that can be used to realize one or more computer-implemented services.

Implementations of the present disclosure are directed to processing items of digital content to predict the occurrence of an event. More particularly, implementations are directed to predicting an event that is going to occur and an approximate time or time range when the event will occur. In some implementations, a plurality of content items are received, each content item including text, for example. The plurality of content items can be processed to provide a set of content items. In some examples, the content items can be filtered based on content items that include a time reference. In this manner, the content items in the set of content items include content items that include a time reference. In some examples, the time reference can be presumed to be associated with an event. In some implementations, an event time can be determined based on the time reference and can be associated with the respective content item. In some implementations, one or more n-grams, e.g., one or more tokens (e.g., characters or words), can be generated for each content item in the subset of content items to provide a set of n-grams. Each n-gram can be associated with the event time provided for the respective content item.

In some implementations, a frequency can be associated with each n-gram. In some examples, the frequency associated with a particular n-gram can be based on a number of times the particular n-gram is provided in the content items of the subset of content items. In some implementations, the n-grams are filtered based the respective frequencies to provide a subset of n-grams. The n-grams in the subset of n-grams can be clustered to provide one or more n-gram clusters. In some examples, the n-grams can be clustered with other n-grams that are associated with the same event time and that appear together in the same content items. In some implementations, a cluster can be associated with the event time that is shared by the n-grams provided in the cluster. In this manner, each cluster can be provided as an event description associated with an event time.

In some implementations, and as discussed in further detail herein, the one or more n-gram clusters can be used by one or more computer-implemented services to influence one or more outputs of the computer-implemented services. In some examples, if an input to a computer-implemented service corresponds to an n-gram cluster and the time that the input is received is proximate to the even time associated with the n-gram cluster, an output can be generated that is responsive to both the input and to the n-gram cluster.

For purposes of illustration, implementations of the present disclosure are described within the context of example computer-implemented services. Example computer-implemented services include an information retrieval service (e.g., search engine), a social networking service, a blogging service, a micro-blogging service and a news publication service. It is appreciated, however, that various implementations described herein can also be used in other types of computer-implemented services and/or as a stand-alone service.

FIG. 1 is a block diagram of an example system architecture 100 that can be used to realize one or more computer-implemented services. In some examples, depicted components and "engines" in FIG. 1 represent functionality that is implemented by one or more computer programs. Although several components are illustrated, there may be fewer or more components in the system architecture 100. Moreover, the components can be distributed on one or more computing devices connected by one or more networks or other suitable communication mediums.

One or more users 102a, 102b, 102c can interact with one or more server systems 114 using respective client devices 104a, 104b, 104c over a network 112. In some examples, each of the client devices 104a, 104b, 104c can be provided as a computing device such as a laptop or desktop computer, a smartphone, a personal digital assistant, a portable media player, a tablet computer, a television with one or more processors embedded therein or coupled thereto, or other appropriate computing devices that can be used to communicate with the one or more server systems 114. For example, the client device 104a can include a random access memory (RAM) 106 (or other memory and/or a storage device) and a processor 108. The processor 108 is structured to process instructions. In some implementations, the processor 108 is a single-threaded processor. In some implementations, the processor 108 is a multi-threaded processor. The processor 108 can include multiple processing cores and can be structured to process instructions stored in the RAM 106 (or other memory and/or a storage device included with the client device 104a) to display graphical information for a user interface.

Users 102a, 102b, 102c of the client devices 104a, 104b, 104c can access the one or more server systems 114 to interact with the computer-implemented services. For example, the client devices 104a, 104b, 104c can execute web browser applications that can be used to access the computer-implemented services. In another example, the client devices 104a, 104b, 104c can execute software applications that are specific to the computer-implemented services (e.g., a social networking "app" running on a smartphone).

In some implementations, the one or more server systems 114 can each be a single computing device such as a computer server. In some implementations, the one or more server systems 114 can represent more than one computing device working together to perform the actions of a server computer (e.g., cloud computing). In some examples, the server systems 114 can each include one or more processors 118 that is configured to process instructions. In some examples, the instructions implement one or more components of the computer-implemented service(s) hosted by the particular server system(s) 114. In some examples, the processor(s) 118 can be a single-threaded processor or a multi-threaded processor, and can include multiple processing cores. In some implementations, the processor(s) 118 process instructions stored in memory and can act to receive information from and transmit information to the client devices 104a, 104b, 104c through the network 112.

In some implementations, the network 112 can be a public communication network (e.g., the Internet, cellular data network, dialup modems over a telephone network) or a private communications network (e.g., private LAN, leased lines).

In some implementations, the one or more server systems 114 can host the one or more computer-implemented services. To that end, and in some examples, the one or more server systems 114 can provide one or more service engines 120, each service engine 120 being associated with a particular computer-implemented service. In the depicted example, the search engine 120 can be associated with a computer-implemented information retrieval service and can include an indexing engine 122 and a ranking engine 128. In some examples, the indexing engine 122 can be used to search a corpus of digital content items (e.g., a large collection of web content) to index content items found in the corpus, and the index information can be stored in an index database 124. In some examples, the corpus can include various types of content items, including, for example, news content 126a (e.g., content items such as news stories, stock market reports, and obituaries), social networking content 126b (e.g., content items such as status updates, comments, and posts to social networking services) and blog content 126c (e.g., content items such as blog and microblog entries). Other types of content items can be included in the corpus.

In some implementations, one or more of the server system(s) 114 can include a cluster engine 130 and a cluster database 132. In some examples, and as discussed in further detail herein, the cluster engine 130 can be used to generate n-gram clusters that are associated with events. For example, the cluster engine 130 can process content items (e.g., from the news content 126a, the social networking content 126b and/or the blog content 126c) to generate one or more n-gram clusters and to associate each of the one or more n-gram clusters with a time and/or date. In some implementations, the one or more n-gram clusters can be stored in the cluster database 132. In some examples, the n-gram clusters of the cluster database 132 can be referenced to influence the computer-implemented services.

Implementations of the present disclosure are directed to generating n-gram clusters that are associated with a time and/or date. In some implementations, each n-gram cluster corresponds to an event that is occurring on or about the time and/or date. In some implementations, each n-gram cluster is generated based on a plurality of content items that are stored in computer-readable memory. In some examples, the content items include news content items (e.g., news articles published by one or more news services), social networking content items (e.g., social networking posts published by one or more users of social networking services) and/or blog content items (e.g., blog articles published by one or more authors using blog services). In some examples, the content items can be limited to content items having less than a threshold number of words provided therein. For example, a plurality of content items can be defined from available content items, the plurality of content items including only those content items having a number of words that is less than the threshold number of words. In this manner, a number of n-grams that can be generated for a given content item, discussed in further detail below, can be restrained.

In some implementations, a set of content items can be provided from the plurality of content items. In some examples, the content items in the plurality of content items can be filtered based on one or more time references. In some examples, a time reference can include a time, a day and/or a date that is discernible from a particular content item. In some examples, a time reference can include temporal keywords provided in the content item. In some examples, if a content item includes a time reference provided therein, the content item is included in the set of content items. As another example, if a content item does not include a time reference therein, the content item is not included in the set of content items. In this manner, the content items in the set of content items include content items that have a time reference provided there. In some examples, the time reference can be presumed to be associated with an event.

In some implementations, an event time can be determined based on the time reference. In some implementations, a time reference can be explicitly provided within a content item. For example, an example content item can provide "2 PM EST on May 26, 2013." Consequently, an example event time can include 2 PM EST on May 26, 2013. In some implementations, a time reference can be implicitly provided within a content item (e.g., in view of one or more temporal keywords). For example, an example content item can provide "Monday afternoon," and/or "tomorrow afternoon." In some examples, a time range can be determined from the implicit time reference. For example, a timestamp associated with the content item can be used to determine a date referenced as "Monday," and/or "tomorrow." If, for example, the content item has a timestamp indicating that the content item was posted on May 25, 2013, the term "tomorrow" can be determined to be May 26, 2013. In some examples, the term "afternoon" can be associated with a time span (e.g., 12 noon to 5:59 PM EST). In some examples, the time zone associated with the time span can be provided as the time zone from which the content item was posted. Consequently, an example event time can include 12 noon to 5:59 PM EST on May 26, 2013. In some implementations, the time reference can be explicitly and implicitly provided within a content item. For example, an example content item can provide "tomorrow at 2 PM EST." A timestamp associated with the content item can be used to determine a date referenced as "tomorrow." If, for example, the content item has a timestamp indicating that the content item was posted on May 25, 2013, the term "tomorrow" can be determined to be May 26, 2013. Consequently, an example event time can include 2 PM EST on May 26, 2013. In some examples, the time reference can be provided as a time range (e.g., May 25, 2013 through May 28, 2013; 10 AM EST through 8 PM EST).

In some implementations, more complicated recognition and deduction of event times can be provided. For example, complex temporal phrases (e.g., "two days from next Sunday") can be processed to determine an event time associated with a respective content item.

In some implementations, one or more n-grams can be generated for each content item in the set of content items to provide a set of n-grams. In some examples, each content item is processed to remove stop words and punctuation, providing clean text. Example stop words can include "the," "a," "an," "that," "is" and "it." In some examples, each content item is processed to remove the one or more time references. For each content item, one or more n-grams can be generated based on the clean text. In some examples, the time reference is not included in the one or more n-grams. Each n-gram can be associated with the event time provided for the respective content item.

In some implementations, the n-grams determined across all content items in the set of content items can be provided in a superset of n-grams. In some examples, the superset of n-grams can include n-gram tuples, each n-gram tuple including a particular n-gram and an event time associated with the particular n-gram (e.g., [n-gram, $t_{EVENT}$]).

In some implementations, a frequency can be associated with each n-gram tuple. In some examples, the frequency associated with a particular n-gram tuple can be based on a number of times the particular n-gram tuple is provided in the superset of n-grams. For example, a first n-gram tuple can include a particular n-gram and a first event time, and a second n-gram tuple can include the particular n-gram and a second event time. The first n-gram tuple can include a first frequency based on a number of times the first n-gram tuple appears in the superset of n-grams, and the second n-gram tuple can include a second frequency based on a number of times the second n-gram tuple appears in the superset of n-grams.

In some implementations, a set of n-grams is provided from the superset of n-grams based on the respective frequencies. In some examples, the set of n-grams include one or more n-gram tuples. For example, an n-gram tuple having a frequency that exceeds a threshold frequency is provided in the set of n-grams. As another example, an n-gram tuple having a frequency that does not exceed the threshold frequency is not provided in the set of n-grams. Continuing with the example above, it can be determined that the first frequency exceeds the threshold frequency, but that the second frequency does not exceed the threshold frequency. Consequently, the first n-gram tuple is included in the set of n-grams, while the second n-gram tuple is not included in the set of n-grams, even though both the first n-gram tuple and the second n-gram tuple include the particular n-gram (e.g., the same n-gram).

In some implementations, n-grams provided in the set of n-grams can be clustered to provide one or more n-gram clusters. In some examples, the n-grams can be clustered with other n-grams that are associated with the same event time or overlapping event times and that appear together in the content items. In some implementations, a cluster can be associated with the event time that is shared by the n-grams provided in the cluster. In this manner, each cluster can be provided as an event description associated with an event time.

FIG. 2 depicts an example content item 200. In the depicted example, the content item 200 includes a published news article referencing the retirement press conference of hypothetical professional athlete "Johnny Superstar." The content item 200 includes an example time reference that is provided as "tomorrow at 2 PM EST." In some examples, the content item 200 is generated and is publicly distributed by a hypothetical online source (e.g., "GenericNewsSite"). In the depicted example, the content item 200 is associated with a posting time and date 204. In some examples, the content item 200 can be received by the cluster engine 130 from the news content 126*a* of FIG. 1.

In accordance with implementations of the present disclosure, the content item 200 can be included in a plurality of content items that are to be processed to generate n-gram clusters, as discussed above. For example, the content item 200 can be processed using the cluster engine 130 of FIG. 1. In the depicted example, the content item 200 includes the time reference 202. Consequently, the content item 200 is included in the set of content items for further processing. In some examples, the time reference 202 can be processed to provide an event time ($t_{EVENT}$). For example, a timestamp associated with the content item can be used to determine a date referenced as "tomorrow" within the time reference 202. If, for example, the content item has a timestamp indicating that the content item was posted on May 25, 2013 (e.g., the post time and date 204), the term "tomorrow" can be determined to be May 26, 2013. Consequently, the event time associated with the example content item 200 can include 2 PM EST on May 26, 2013.

In some examples, the text of the content item 200 is filtered or cleaned to remove stop words, punctuation and/or the one or more time references to provide a clean text version of the content item 200. For example, there may be some predetermined stop words, special characters, or phrases that are filtered out of the content item text. In some examples, entire classes of words (e.g., pronouns, articles, and/or prepositions) can be removed from the text. Various other criteria associated with appropriate text recognition techniques can also be used to identify portions of the text to be removed. For example, the content item 200 can be processed using the cluster engine 130 of FIG. 1 to provide the clean text.

In some implementations, the clean text is processed to generate one or more n-grams associated with the content item 200. For example, the cluster engine 130 of FIG. 1 can generate one or more n-grams based on the clean text.

In some implementations, a content item (and consequently, clean text provided from the content item) can include a significant amount of text (e.g., a number of words that is exceeds a threshold number of words). In some examples, only select portions of the content item are processed for generating descriptive n-grams. For example, the content item 200 could be provided as a relative verbose news article. Accordingly, it can be determined that only the title, "Johnny Superstar, Tigers guard, to announce retirement at press conference," is to be processed to generate representative n-grams.

From the depicted example, example n-grams that can be generated include "Johnny," "Jonny Superstar," "guard," "Tigers guard," "retirement," "announce," "press conference," "football," "league MVP" and "retirement press conference." Of course, these example n-grams are merely a few of the many possible n-grams that can be determined from clean text of the content item 200. In some examples, all possible n-grams for a given portion of the content item 200 can be generated. In some examples, a threshold value is provided to limit the n number terms included in the n-grams. In one example, all possible n-grams up to 4-grams are generated based on the clean text.

In some implementations, each of the n-grams is associated with the event time to provide one or more n-gram tuples. In view of the content item 200, Table 1 provides example n-gram tuples:

TABLE 1

| Content Item 200 | |
|---|---|
| {Johnny; 2PM EST, 5-26-2013} | {Superstar; 2PM EST, 5-26-2013} |
| {guard; 2PM EST, 5-26-2013} | {Tigers guard; 2PM EST, 5-26-2013} |
| {retirement; 2PM EST, 5-26-2013} | {announce; 2PM EST, 5-26-2013} |
| {press conference; 2PM EST, 5-26-2013} | {retirement press conference; 2PM EST, 5-26-2013} |

Figure 3:
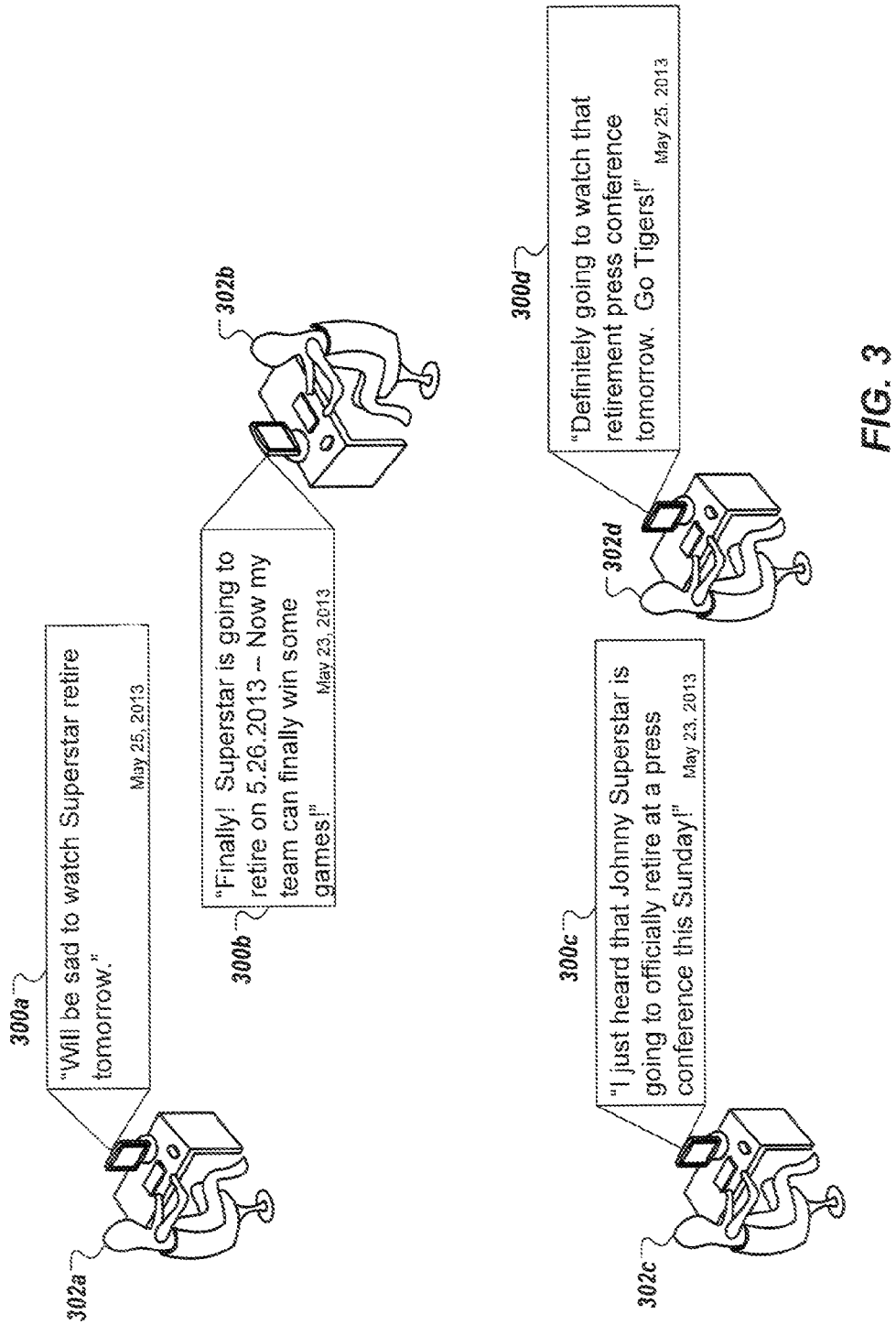
FIG. 3 depicts example content items.

FIG. 3 depicts example content items 300*a*, 300*b*, 300*c*, 300*d*. In the depicted example, the content items 300*a*, 300*b*, 300*c*, 300*d* include social networking posts publicly distributed by respective users 302*a*, 302*b*, 302*c*, 302*d* using a social networking service. The example content items 300*a*, 300*b*, 300*c*, 300*d* refer to the retirement press conference of the hypothetical professional athlete, Johnny Superstar, which is the subject of the content item 200 of FIG. 2. In some examples, the content items 300*a*, 300*b*, 300*c*, 300*d* can be received by the cluster engine 130 from the social network content 126*b* of FIG. 1. In some examples, the content items 300*a*, 300*b*, 300*c*, 300*d* are anonymized, such that identities of the respective users 302*a*, 302*b*, 302*c*, 302*d* are indiscernible.

In the depicted example, the content items 300*a*, 300*b*, 300*c*, 300*d* can be included in a plurality of content items that are to be processed to generate n-gram clusters, as discussed above. For example, the content items 300*a*, 300*b*, 300*c*, 300*d* can be processed using the cluster engine 130 of FIG. 1. In the depicted example, the content items 300*a*, 300*b*, 300*c*, 300*d* each include a time reference. Consequently, the content items 300*a*, 300*b*, 300*c*, 300*d* are included in the set of content items for further processing. In some examples, the time references can be processed to provide respective event times ($t_{EVENT}$). For example, timestamps associated with the respective content items 300*a*, 300*b*, 300*c*, 300*d* can be used to determine a date referenced as "tomorrow," and/or "this Sunday." For example, the content items 300*a*, 300*d* have respective timestamps indicating that the content items 300*a*, 300*d* were posted on May 25, 2013. Consequently, the term "tomorrow" can be determined to be May 26, 2013. Consequently, the event time associated with the example content items 300*a*, 300*d* can include May 26, 2013.

In some examples, the text of each of the content items 300*a*, 300*b*, 300*c*, 300*d* is filtered or cleaned to remove stop words, punctuation and/or the one or more time references to provide a clean text version of the content item 200. For example, there may be some predetermined stop words, special characters, or phrases that are filtered out of the content item text. In some examples, entire classes of words (e.g., pronouns, articles, and/or prepositions) can be removed from the text. Various other criteria associated with appropriate text recognition techniques can also be used to identify portions of the text to be removed. For example, the content items 300a, 300b, 300c, 300d can be processed using the cluster engine 130 of FIG. 1 to provide the clean text.

In some implementations, the clean text is processed to generate one or more n-grams associated with each of the content items 300a, 300b, 300c, 300d. For example, the cluster engine 130 of FIG. 1 can generate one or more n-grams based on the respective clean texts.

In some implementations, each of the n-grams is associated with the event time to provide one or more n-gram tuples. In view of the respective content items 300a, 300b, 300c, 300d, Table 2 provides example n-gram tuples:

TABLE 2

| Content Item 300a | Content Item 300b | Content Item 300c | Content Item 300d |
|---|---|---|---|
| {watch; 5-26-2013} | {Superstar; 5-26-2013} | {Superstar; 5-26-2013} | {press conference; 5-26-2013} |
| {Superstar; 5-26-2013} | {Superstar retire; 5-26-2013} | {press conference; 5-26-2013} | {retirement; 5-26-2013} |
| {retire; 5-26-2013} | {retire; 5-26-2013} | {retire; 5-26-2013} | {Tigers; 5-26-2013} |
| {Superstar retire; 5-26-2013} | {win games; 5-26-2013} | {Superstar retire; 5-26-2013} | {retirement press conference; 5-26-2013} |

In some implementations, the n-gram tuples generated based on the content item 200 (e.g., the example n-gram tuples provided in Table 1) and the n-gram tuples generated based on the content items 300a, 300b, 300c, 300d (e.g., the example n-gram tuples provided in Table 2) can be included in a superset of n-gram tuples. In some examples, the superset of n-gram tuples includes n-gram tuples generated from other sources of content items, which can include subjects that are unrelated to each other and/or unrelated to the subject matter of the content items 200, 300a, 300b, 300c, 300d (e.g., the retirement of Johnny Superstar).

In general, events can be referenced in the text of a relatively large number of content items over a representative subset drawn from a web corpus. Consequently, detection of events includes aggregating n-grams generated over a plurality of content items, and determining which n-grams associated with specific event times are generated relatively frequently. Consequently, and in some implementations, frequencies of each n-gram tuple can be determined over the superset of n-grams. In some examples, the frequency of a particular n-gram tuple can be compared to a threshold frequency value to determine whether the event underlying with the n-gram is indicative of a noteworthy, or otherwise popular event. In some examples, the threshold frequency value may vary between implementations and can be tuned to provide desired results.

In some examples, an n-gram tuple of the superset can be compared to other n-gram tuples in the superset of n-grams to determine a number of times that the n-gram tuple appears in the superset of n-grams and to determine a frequency associated with the n-gram tuple. In some examples, n-gram tuples can be considered to be equivalent if the n-grams and the event times of the n-gram tuples match. In some examples, n-gram tuples can be considered to be equivalent if the n-grams match and the respective event times overlap. For example, and with reference to Tables 1 and 2 above, the n-gram tuples {Superstar; 2 PM EST, 5-26-2013}, {Superstar; 5-26-2013}, {Superstar; 5-26-2013} and {Superstar; 5-26-2013} can be provided in the superset of n-grams. It can be determined that the n-gram tuples are equivalent, because the n-gram "Superstar" matches across all n-gram tuples and the respective event times are the same or overlap (e.g., the event time 2 PM EST, 5-26-2013 and the event times 5-26-2013 overlap). Consequently, the number of times that each of these example tuples appears in the superset of n-grams is at least four. In some examples, a frequency for an n-gram tuple can be determined as a ratio of the number of times the n-gram tuple appears in the superset of n-gram tuples to the number of n-gram tuples provided in the superset of n-gram tuples.

A set of n-grams can be provided from the superset of n-grams based on frequency. In some examples, the frequencies of the n-gram tuples in the superset of n-grams are each compared to the threshold frequency. If the frequency of the respective n-gram tuple exceeds the threshold frequency, the n-gram tuple is included in the set of n-grams. If the frequency of the respective n-gram tuple does not exceed the threshold frequency, the n-gram tuple is not included in the set of n-grams.

Using the set of n-grams, n-grams relating to the same event are grouped to form an n-gram cluster that is associated with the event time. In some examples, the n-grams of the n-gram tuples in the set of n-gram tuples are processed in view of the content items in the corpus of content items (e.g., the news content 126a, the social network content 126b and the blog content 126c of FIG. 1) to cluster n-grams that were originally posted together in time-referring content items. In some examples, each n-gram cluster is provided as tuple of n-grams associated with an event time. In this manner, each n-gram cluster provides a list of n-grams that describe an event and the event time at which, or over which, the event occurs or occurred. Continuing with the example above, an example n-gram cluster can include {"Superstar", "retire", "press conference"; 5-26-2013}, because the n-grams appear together in at least the time-referring content items 200, 300a, 300b, 300c.

Figure 4:
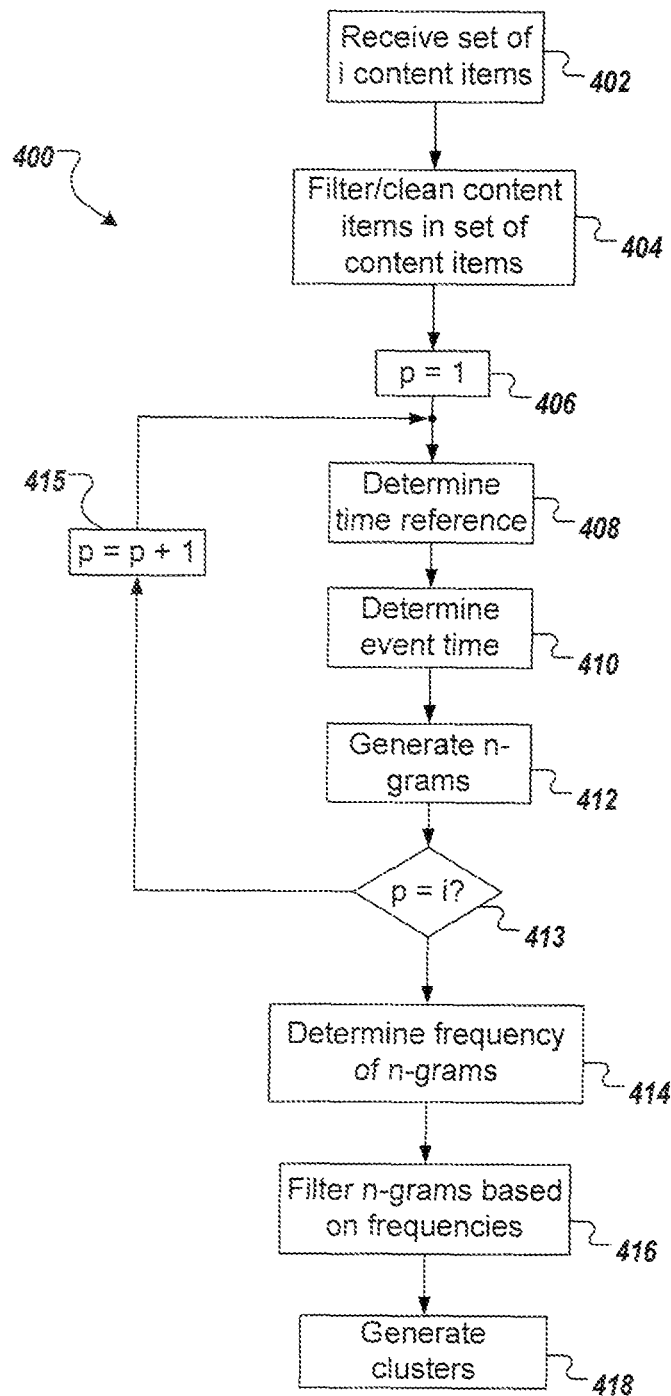
FIG. 4 depicts an example process for generating n-gram clusters.

FIG. 4 depicts an example process 400 for generating n-gram clusters. The example process 400 can be provided using one or more computer program applications executed on one or more computing devices. For example, the server system(s) 114 can be used to execute the example process 400.

A set of content items is received (402). For example, the server system 114 can receive a set of content items from a content repository (e.g., the index database 124 of FIG. 1). In some examples, the set of content items can include i content items, where i is provided as an integer that is equal to or greater than 1. In some examples, the content items in the set of content items only include content items that have been determined to include a time reference therein. The content items are each filtered or cleaned to provide clean text (404). For example, various stop words, punctuation, and other types of special characters can be removed from the text contained in the content items to provide clean text.

A counter p is set equal to 1 (406). A time reference associated with the $p^{th}$ content item is determined (408). For example, the time reference can be determined based on one or more explicit and/or implicit references provided in the $p^{th}$ content item. An event time ($t_{EVENT}$) is determined for the $p^{th}$ content item (410). In some examples, and as discussed above, the event time is determined based on the time reference and a timestamp associated with the $p^{th}$ content item. One or more n-grams are determined from the clean text of the $p^{th}$ content item (412). In some examples, each n-gram is associated with the event time and is provided in an n-gram tuple in a superset of n-grams. It is determined whether p is equal to i (413). If p is not equal to i, all of the content items in the set of content items have not been processed. Consequently, the counter p is incremented (415) and the process 400 loops back.

If p is equal to i, all of the content items in the set of content items have been processed, and a frequency for each n-gram in the superset of n-grams is determined (414). For example, and as discussed above, each frequency can be determined based on a number of times a particular n-gram is deemed to appear in the superset of n-grams. The n-grams are filtered based on frequency (416). For example, the n-grams can be filtered to provide a set of n-grams from the superset of n-grams. In some examples, each frequency can be compared to a threshold frequency. If the frequency does not meet or exceed the threshold frequency, the respective n-gram tuple is not included in the set of n-grams. One or more n-gram clusters is generated based on the set of n-grams (418). In some examples, n-grams relating to the same event are grouped to form an n-gram cluster that is associated with the event time. In some examples, the n-grams of the n-gram tuples in the set of n-grams are processed in view of the content items in the set of content items to cluster n-grams that were originally posted together in time-referring content items. In some examples, each n-gram cluster is provided as a tuple of n-grams associated with an event time. In this manner, each n-gram cluster provides a list of n-grams that describe an event and the event time at which, or over which, the event occurs or occurred.

As discussed above, the one or more n-gram clusters can be stored in a cluster database (e.g., the cluster database 132 of FIG. 1). In some implementations, the stored n-gram clusters can be referenced to influence one or more computer-implemented services.

In one example, the stored n-gram clusters can be referenced to influence an information retrieval service. For example, a searching user can submit a search query to a search engine. In some examples, the search query can be input by the searching user at a time ($t_{INPUT}$). In some examples, the search query can include one or more search terms. It can be determined whether the search terms are included in at least one n-gram cluster. It can be determined whether $t_{INPUT}$ is proximate to the event time ($t_{EVENT}$) associated with the at least one n-gram cluster. In some examples, $t_{INPUT}$ can be determined to be proximate to $t_{EVENT}$, if $t_{INPUT}$ falls within a time period defined by $t_{EVENT}$ (e.g., $t_{EVENT}$ includes the time period of May 23, 2013 through May 28, 2013, and $t_{INPUT}$ includes May 25, 2013). In some examples, $t_{INPUT}$ can be determined to be proximate to $t_{EVENT}$, if $t_{INPUT}$ is within a threshold time period before or after $t_{EVENT}$ (e.g., a threshold time periods includes 2 hours, $t_{EVENT}$ includes 2 PM on May 25, 2013, and $t_{INPUT}$ includes 1 PM on May 25, 2013).

In some examples, if it is determined that the search terms are included in the at least one n-gram cluster, but it is determined that $t_{INPUT}$ is not proximate to $t_{EVENT}$ associated with the at least one n-gram cluster, a first set of search results responsive to the search query can be provided and can be transmitted for display to the searching user. In some examples, if it is determined that the search terms are included in the at least one n-gram cluster and it is determined that $t_{INPUT}$ is proximate to $t_{EVENT}$ associated with the at least one n-gram cluster, a second set of search results responsive to the search query can be provided and can be transmitted for display to the searching user. In some examples, one or more search results in the first set of search results are different than one or more search results in the second set of search results.

In some examples, search results in the first set of search results are displayed to the searching user in a different order than corresponding search results in the second set of search results.

Continuing with the example provided above, an n-gram cluster can include {"Johnny", "Superstar", "Johnny Superstar", "retire", "press conference"; 2 PM EST on 5-26-2013}. In one example, a searching user can submit the search query "Johnny Superstar" to a computer-implemented information retrieval service on May 25, 2013 (e.g., $t_{INPUT}$ indicates May 25, 2013). It can be determined that the search query is included in the n-gram cluster, but that $t_{INPUT}$ is not proximate to $t_{EVENT}$ (e.g., 2 PM EST on May 25, 2013). Consequently, a first set of search results are received and are transmitted for display to the searching user. In some examples, the first set of search results can include a homepage associated with Johnny Superstar's team, Johnny Superstar's homepage and several news articles related to Johnny Superstar, the search results being displayed in the order as listed. The searching user can submit the search query "Johnny Superstar" to the computer-implemented information retrieval service at 2 PM EST on May 25, 2013 (e.g., $t_{INPUT}$ indicates 2 PM EST on May 25, 2013). It can be determined that the search query is included in the n-gram cluster and that $t_{INPUT}$ is proximate to $t_{EVENT}$ (e.g., 2 PM EST on May 25, 2013). Consequently, a second set of search results are received and are transmitted for display to the searching user. In some examples, the second set of search results can include a live video of the press conference, news articles discussing Johnny Superstar's retirement, other news articles related to Johnny superstar, a homepage associated with Johnny Superstar's team and Johnny Superstar's homepage, the search results being displayed in the order as listed.

In some examples, event recommendations can be provided to one or more users. For example, user-associated data and the stored n-gram clusters can be referenced to generate a recommendation to a user that the user attend an event. For example, an event can include a concert that is associated with an event time. It can be determined that the user is a music fan and/or a fan of the particular band playing the concert. In some examples, it can be determined that the user is located within a convenient proximity to a location of the concert. In some examples, and in response to determining that the event is occurring at the event time and that the user is a music fan and/or a fan of the particular band playing the concert and/or that the user is located within a convenient proximity to the location of the concert, a recommendation to attend the concert can be provided to the user. For example, a computer-implemented service (e.g., a social networking service) can provide notification to the user, the notification providing the recommendation to the attend the concert.

In some examples, stored n-gram clusters can be based on digital content distributed by one or more users that are contacts of a particular user within a computer-implemented social networking service. In some examples, an event recommendation can be generated and can be provided to the particular user in response to recognizing that the one or more users are contacts of the user. For example, the one or more users can distribute digital content, from which an n-gram cluster describing an event can be generated. For example, the one or more users can express the occurrence of the event and/or their attendance at the event. Because the particular user is a contact of the one or more users, a recommendation that the particular user attend the event can be provided to the particular user.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the present disclosure can be realized as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method executed using one or more processors, the method comprising:
   receiving a set of content items, each content item in the set of content items including a time reference and comprising digital content that is distributed using one or more computer-implemented services;
   for each content item in the set of content items:
      identifying i) a timestamp associated with a distribution of the content item and ii) a time reference indicated within the content item;

based on i) the timestamp associated with the distribution of the content item and ii) the time reference indicated within the content item, determining an event time;

identifying one or more n-grams based on text of the content item, associating each of the one or more n-grams with the event time, and including the one or more n-grams in a superset of n-grams, the superset of n-grams comprising n-grams provided from one or more of the content items in the set of content items;

generating one or more n-gram clusters based on the superset of n-grams, each n-gram cluster providing a description of an event and comprising at least one n-gram and an associated event time;

storing each of the one or more n-gram clusters in a cluster database;

receiving a search query at an input time;

determining i) that the search query is included in a first n-gram cluster of the one or more n-gram clusters, and ii) that the input time is within a threshold time period with respect to the associated event time of the first n-gram cluster, and in response to the determining, providing a first set of search results associated with one or more content items related to the first n-gram cluster; and determining i) that the search query is included in a second n-gram cluster of the one or more n-gram clusters and ii) that the input time is not within a threshold time period with respect to the associated event time of the second n-gram cluster, and in response to the determining, providing a second set of search results responsive to the search query, the second set of search results differing from the first set of search results.

2. The method of claim 1, further comprising, for each content item in the set of content items, removing one or more characters to provide the text as clean text.

3. The method of claim 2, wherein the one or more characters comprise at least one of one or more stop words and punctuation.

4. The method of claim 1, wherein generating one or more n-gram clusters comprises:

determining one or more frequencies, each frequency being associated with an n-gram of the superset of n-grams; and providing a set of n-grams based on the one or more frequencies, the set of n-grams comprising a subset of the superset of n-grams, wherein the one or more n-gram clusters are generated based on n-grams provided in the set of n-grams.

5. The method of claim 4, wherein a frequency for a particular n-gram is determined based on a number of times the particular n-gram is provided in the superset of n-grams.

6. The method of claim 4, wherein providing a set of n-grams based on the one or more frequencies comprises, for each n-gram in the superset of n-grams:

determining whether a respective frequency meets or exceeds a threshold frequency; and including the n-gram in the set of n-grams if the respective frequency meets or exceeds the threshold frequency.

7. The method of claim 1, wherein the set of content items is provided as a subset of a plurality of content items.

8. The method of claim 7, wherein receiving a set of content items comprises:

receiving the plurality of content items;

for each content item in the plurality of content items, determining whether the content item includes a time reference; and including the content item in the set of content items if the content item includes a time reference.

9. A system, comprising:

one or more processors; and a computer-readable medium coupled to the one or more processors and having instructions stored thereon which, when executed by the one or more processors, cause the one or more processors to perform operations comprising:

receiving a set of content items, each content item in the set of content items including a time reference and comprising digital content that is distributed using one or more computer-implemented services;

for each content item in the set of content items:

identifying i) a timestamp associated with a distribution of the content item and ii) a time reference indicated within the content item;

based on i) the timestamp associated with the distribution of the content item and ii) the time reference indicated within the content item, determining an event time;

identifying one or more n-grams based on text of the content item, associating each of the one or more n-grams with the event time, and including the one or more n-grams in a superset of n-grams, the superset of n-grams comprising n-grams provided from one or more of the content items in the set of content items;

generating one or more n-gram clusters based on the superset of n-grams, each n-gram cluster providing a description of an event and comprising at least one n-gram and an associated event time;

storing each of the one or more n-gram clusters in a cluster database;

receiving a search query at an input time;

determining i) that the search query is included in a first n-gram cluster of the one or more n-gram clusters and ii) that the input time is within a threshold time period with respect to the associated event time of the first n-gram cluster, and in response to the determining, providing a first set of search results associated with one or more content items related to the first n-gram cluster; and determining i) that the search query is included in a second n-gram cluster of the one or more n-gram clusters and ii) that the input time is not within a threshold time period with respect to the associated event time of the second n-gram cluster, and in response to the determining, providing a second set of search results responsive to the search query, the second set of search results differing from the first set of search results.

10. The system of claim 9, wherein operations further comprise, for each content item in the set of content items, removing one or more characters to provide the text as clean text.

11. The system of claim 10, wherein the one or more characters comprise at least one of one or more stop words and punctuation.

12. The system of claim 9, wherein generating one or more n-gram clusters comprises:
   determining one or more frequencies, each frequency being associated with an n-gram of the superset of n-grams; and
   providing a set of n-grams based on the one or more frequencies, the set of n-grams comprising a subset of the superset of n-grams,
   wherein the one or more n-gram clusters are generated based on n-grams provided in the set of n-grams.

13. The system of claim 12, wherein a frequency for a particular n-gram is determined based on a number of times the particular n-gram is provided in the superset of n-grams.

14. The system of claim 12, wherein providing a set of n-grams based on the one or more frequencies comprises, for each n-gram in the superset of n-grams:
   determining whether a respective frequency meets or exceeds a threshold frequency; and
   including the n-gram in the set of n-grams if the respective frequency meets or exceeds the threshold frequency.

15. The system of claim 9, wherein the set of content items is provided as a subset of a plurality of content items.

16. The system of claim 15, wherein receiving a set of content items comprises:
   receiving the plurality of content items;
   for each content item in the plurality of content items, determining whether the content item includes a time reference; and
   including the content item in the set of content items if the content item includes a time reference.

17. A computer-readable medium coupled to one or more processors having instructions stored thereon which, when executed by the one or more processors, cause the one or more processors to perform operations comprising:
   receiving a set of content items, each content item in the set of content items including a time reference and comprising digital content that is distributed using one or more computer-implemented services;
   for each content item in the set of content items:
      identifying i) a timestamp associated with a distribution of the content item and ii) a time reference indicated within the content item;
      based on i) the timestamp associated with the distribution of the content item and ii) the time reference indicated within the content item, determining an event time;
      identifying one or more n-grams based on text of the content item,
      associating each of the one or more n-grams with the event time, and
      including the one or more n-grams in a superset of n-grams, the superset of n-grams comprising n-grams provided from one or more of the content items in the set of content items;
   generating one or more n-gram clusters based on the superset of n-grams, each n-gram cluster providing a description of an event and comprising at least one n-gram and an associated event time;
   storing each of the one or more n-gram clusters in a cluster database;
   receiving a search query at an input time;
   determining i) that the search query is included in a first n-gram cluster of the one or more n-gram clusters and ii) that the input time is within a threshold time period with respect to the associated event time of the first n-gram cluster, and in response to the determining, providing a first set of search results associated with one or more content items related to the first n-gram cluster; and
   determining i) that the search query is included in a second n-gram cluster of the one or more n-gram clusters and ii) that the input time is not within a threshold time period with respect to the associated event time of the second n-gram cluster, and in response to the determining, providing a second set of search results responsive to the search query, the second set of search results differing from the first set of search results.

18. The computer-readable medium of claim 17, wherein operations further comprise, for each content item in the set of content items, removing one or more characters to provide the text as clean text.

19. The computer-readable medium of claim 18, wherein the one or more characters comprise at least one of one or more stop words and punctuation.

20. The computer-readable medium of claim 17, wherein generating one or more n-gram clusters comprises:
   determining one or more frequencies, each frequency being associated with an n-gram of the superset of n-grams; and
   providing a set of n-grams based on the one or more frequencies, the set of n-grams comprising a subset of the superset of n-grams,
   wherein the one or more n-gram clusters are generated based on n-grams provided in the set of n-grams.

21. The computer-readable medium of claim 20, wherein a frequency for a particular n-gram is determined based on a number of times the particular n-gram is provided in the superset of n-grams.

22. The computer-readable medium of claim 20, wherein providing a set of n-grams based on the one or more frequencies comprises, for each n-gram in the superset of n-grams:
   determining whether a respective frequency meets or exceeds a threshold frequency; and
   including the n-gram in the set of n-grams if the respective frequency meets or exceeds the threshold frequency.

23. The computer-readable medium of claim 17, wherein the set of content items is provided as a subset of a plurality of content items.

24. The computer-readable medium of claim 23, wherein receiving a set of content items comprises:
   receiving the plurality of content items;
   for each content item in the plurality of content items, determining whether the content item includes a time reference; and
   including the content item in the set of content items if the content item includes a time reference.

\* \* \* \* \*